(12) United States Patent
Wagner

(10) Patent No.: US 7,550,128 B2
(45) Date of Patent: Jun. 23, 2009

(54) METHOD AND APPARATUS FOR PRODUCING CARBON NANOSTRUCTURES

(75) Inventor: Anthony S. Wagner, Austin, TX (US)

(73) Assignee: Clean Technologies International Corporation, Sherwood, AR (US)

( * ) Notice: Subject to any disclaimer, the term of this patent is extended or adjusted under 35 U.S.C. 154(b) by 838 days.

(21) Appl. No.: 10/887,695

(22) Filed: Jul. 9, 2004

(65) Prior Publication Data

US 2006/0008405 A1    Jan. 12, 2006

(51) Int. Cl.
*B01J 19/08* (2006.01)
*F23G 7/00* (2006.01)

(52) U.S. Cl. .................. 423/445 B; 423/447.1; 423/447.3; 977/842; 977/844; 110/235; 110/237; 110/243

(58) Field of Classification Search ............. 423/445 B, 423/460, 461, DIG. 12, 447.1, 447.3; 110/235, 110/237, 243; 977/842, 844
See application file for complete search history.

(56) References Cited

U.S. PATENT DOCUMENTS

| | | | |
|---|---|---|---|
| 3,066,099 A | | 11/1962 | Mohun |
| 4,357,234 A | | 11/1982 | Inculet et al. |
| 4,663,230 A | | 5/1987 | Tennent |
| 5,000,101 A | * | 3/1991 | Wagner ............ 110/346 |
| 5,094,906 A | | 3/1992 | Witzke et al. |
| 5,167,919 A | | 12/1992 | Wagner |
| 5,271,341 A | | 12/1993 | Wagner |
| 5,346,683 A | | 9/1994 | Green et al. |
| 5,359,947 A | | 11/1994 | Wagner |
| 5,424,054 A | | 6/1995 | Bethune et al. |
| 5,431,113 A | * | 7/1995 | Wagner ............ 110/237 |
| 5,452,671 A | * | 9/1995 | Wagner ............ 110/346 |
| 5,457,343 A | | 10/1995 | Ajayan et al. |
| 5,461,991 A | | 10/1995 | Wagner |
| 5,482,601 A | | 1/1996 | Ohshima et al. |
| 5,489,477 A | | 2/1996 | Ohta et al. |
| 5,553,558 A | | 9/1996 | Wagner |
| 5,560,898 A | | 10/1996 | Uchida et al. |
| 5,564,351 A | * | 10/1996 | Wagner ............ 110/346 |
| 5,640,702 A | * | 6/1997 | Shultz ............ 588/1 |
| 5,641,466 A | | 6/1997 | Ebbesen et al. |
| 5,695,734 A | | 12/1997 | Ikazaki et al. |
| 5,698,175 A | | 12/1997 | Hiura et al. |

(Continued)

OTHER PUBLICATIONS

Mamalis, et al., Nanotechnology and nanostructured materials: trends in carbon nanotubes, Precision Engineering 2004; 28: 16-30.*

(Continued)

*Primary Examiner*—Stuart L. Hendrickson
*Assistant Examiner*—Daniel C. McCracken
(74) *Attorney, Agent, or Firm*—Russell D. Culbertson; The Culbertson Group, P.C.

(57) ABSTRACT

A method includes liberating carbon atoms from hydrocarbon molecules by reaction with or in a reactant liquid and maintaining the liberated carbon atoms in an excited state. The chemically excited liberated carbon atoms are then enabled to traverse a surface of the reactant liquid and are directed across a collection surface. The collection surface and the conditions at and around the collection surface are maintained so that the liberated carbon atoms in the excited state phase change to a ground state by carbon nanostructure self-assembly.

30 Claims, 4 Drawing Sheets

U.S. PATENT DOCUMENTS

| | | |
|---|---|---|
| 5,753,088 A | 5/1998 | Olk |
| 5,832,845 A | 11/1998 | Wagner |
| 6,037,517 A * | 3/2000 | Wagner .................. 588/1 |
| 6,069,290 A * | 5/2000 | Wagner .................. 588/1 |
| 6,195,382 B1 | 2/2001 | Wagner |
| 6,227,126 B1 * | 5/2001 | Wagner .................. 110/250 |
| 6,256,466 B1 | 7/2001 | Ota et al. |
| 6,270,735 B2 | 8/2001 | Wagner |
| 6,303,094 B1 | 10/2001 | Kusunoki et al. |
| 6,333,016 B1 | 12/2001 | Resasco et al. |
| 6,346,221 B1 * | 2/2002 | Wagner .................. 422/184.1 |
| 6,355,857 B1 | 3/2002 | Wagner |
| 6,451,175 B1 | 9/2002 | Lal |
| 6,455,021 B1 | 9/2002 | Saito |
| 6,669,755 B2 | 12/2003 | Wagner |
| 6,683,783 B1 | 1/2004 | Smalley et al. |
| 6,717,026 B2 * | 4/2004 | Wagner .................. 588/314 |
| 6,740,224 B1 | 5/2004 | Benavides et al. |
| 6,740,403 B2 | 5/2004 | Gogotsi et al. |
| 6,761,871 B2 | 7/2004 | Little |
| 6,765,949 B2 | 7/2004 | Chang |
| 6,841,003 B2 | 1/2005 | Kang et al. |
| 6,843,850 B2 | 1/2005 | Avouris et al. |
| 6,929,676 B2 | 8/2005 | Wagner |
| 7,034,197 B2 | 4/2006 | Wagner |
| 7,365,237 B2 | 4/2008 | Wagner |
| 2002/0102193 A1 | 8/2002 | Smalley et al. |
| 2002/0127169 A1 | 9/2002 | Smalley et al. |
| 2002/0159943 A1 | 10/2002 | Smalley et al. |
| 2003/0109768 A1 | 6/2003 | Wagner |
| 2003/0129119 A1 | 7/2003 | Chiu et al. |
| 2004/0057896 A1 | 3/2004 | Kronholm et al. |
| 2004/0191138 A1 | 9/2004 | Wagner |
| 2005/0261760 A1 | 11/2005 | Weber |
| 2006/0008403 A1 | 1/2006 | Wagner |
| 2006/0008406 A1 | 1/2006 | Wagner |
| 2006/0021510 A1 | 2/2006 | Henley et al. |
| 2006/0034746 A1 | 2/2006 | Wagner |
| 2007/0116633 A1 | 5/2007 | Wagner |
| 2008/0050303 A1 | 2/2008 | Wagner |
| 2008/0056908 A1 | 3/2008 | Wagner |

OTHER PUBLICATIONS

Dai, Carbon nanotubes: opportunities and challenges, Surface Science 2002: 500: 218-241.*

Journet, et al., Large-scale production of single-walled carbon nanotubes by the electric-arc technique, Nature 1997; 338:756-758.*

Written Opinion of the International Search Authority (PCT Rule 43bis. 1) for PCT/US2005/23370 dated Sep. 20, 2006 (4 Pages).

International Search Report for PCT/US2005/23370 dated Sep. 20, 2006 (2 Pages).

Levesque et al., "Monodisperse carbon nanopearls in a foam-like arrangement: a new carbon nano-compound for cold cathodes," Elsevier, Thin Solid Films, Jul. 28, 2004, vol. 464-465, pp. 308-314.

Dresselhaus et al., "Carbon Nanotubes Synthesis, Structure, Properties, and Applications," Topics of Applied Physics, Springer (2001), 7 pages.

Journet et al., "Production of carbon nanotubes," Applied Physics A, Materials Science & Processing, Springer-Veerlag (1998), 9 pages.

International Search Report for PCT/US2005/029085 dated Sep. 5, 2006, 2 pages.

Written Opinion of the International Search Authority (PCT Rule 43bis. 1) for PCT/US2005/029085 dated Sep. 5, 2006, 3 pages.

International Search Report for PCT/US2005/045334 dated May 19, 2008, 2 pages.

Written Opinion of the International Search Authority (PCT Rule 43bis. 1) for PCT/US2005/045334 dated May 19, 2008, 5 pages.

International Search Report for PCT/US2006/023962 dated Jul. 18, 2008, 2 pages.

Written Opinion of the International Search Authority (PCT Rule 43bis. 1) for PCT/US2006/023962 dated Jul. 18, 2008, 4 pages.

International Search Report for PCT/US2007/067794 dated Apr. 30, 2008, 2 pages.

Written Opinion of the International Search Authority (PCT Rule 43bis. 1) for PCT/US2007/067794 dated Apr. 30, 2008, 6 pages.

Wagner, "Method and Apparatus for Producing Carbon Nanostructures," filed Oct. 31, 2007, U.S. Appl. No. 11/931,802, 30 pages.

Wagner, "Method and Apparatus for Preparing a Collection Surface for Use in a Produccing Carbon Nanostructures," filed Oct. 31, 2007, U.S. Appl. No. 11/932,020, 34 pages.

* cited by examiner

METHOD AND APPARATUS FOR PRODUCING CARBON NANOSTRUCTURES

TECHNICAL FIELD OF THE INVENTION

The present invention relates to a method for manufacturing carbon nanotubes from a hydrocarbon feedstock. The invention also includes an apparatus for manufacturing carbon nanotubes.

BACKGROUND OF THE INVENTION

Carbon nanostructures have received a great deal of interest since their discovery. It has been suggested that carbon nanostructures may have important applications in electronics, in materials sciences, and in a number of additional fields. As used in this disclosure, a carbon nanostructure comprises a structure formed from chemically bonded carbon atoms, with or without impurities or intentionally added materials incorporated in the carbon structure or adjacent to the carbon structure. Carbon nanostructures include particularly carbon nanotubes in which carbons atoms are arranged in generally a hexagonal ring with a series of such rings arranged along a linear or curved axis side-by-side to form a tube structure. Carbon nanotubes may be single walled or multiple walled. Single wall nanotubes include a single hexagonal arrangement of carbon atoms arranged side-by-side with other such hexagonal rings, while multiple walled nanotubes are made up of a series of inner hexagonal rings and a series of one or more layers of outer hexagonal rings.

Despite the interest in carbon nanostructures and the potentially important uses for such structures, the practical application of carbon nanostructures in products has been slowed by the difficulty in manufacturing such structures. Two general types of processes have been employed to produce or isolate carbon nanostructures. One process type uses a plasma arc between carbon electrodes. U.S. Pat. Nos. 5,482,601 and 5,753,088 describe such carbon plasma arc processes for producing carbon nanotubes. Another process type involves simply isolating naturally formed, self-assembled carbon nanotubes from graphite and soot. Such an isolation process or refinement process for carbon nanotubes is described in U.S. Pat. No. 5,560,898.

The prior processes for producing or isolating carbon nanotubes have been found to produce only small quantities of carbon nanotubes of inconsistent quality. The low quality carbon nanotubes produced or isolated by the prior methods commonly included metal or other atoms incorporated in the carbon structure. These impurities incorporated in the walls of the carbon nanotubes may have a negative impact on the qualities and properties of the nanotube and may render it unsuitable for an intended purpose.

SUMMARY OF THE INVENTION

The present invention provides a method for manufacturing high quality, substantially impurity-free carbon nanostructures in relatively large quantities. The method also encompasses apparatus for performing the carbon nanostructure production method and for collecting the resulting carbon nanostructures.

A method embodying the principles of the invention includes liberating carbon atoms from hydrocarbon molecules and maintaining the liberated carbon atoms in an excited state by treatment within a reactant liquid. The liberation of carbon atoms according to the invention may be by chemical reduction, chemical oxidation, reactions from acids, bases, or salts, or pyrolysis in the reactant liquid. For example, one preferred form of the invention utilizes a liquid reactant metal to chemically reduce the hydrocarbon feed material to liberate carbon atoms and maintain the liberated carbon atoms in a chemically reactive, excited state. Regardless of the specific chemical process or mechanism by which the carbon atoms are liberated, the chemically excited liberated carbon atoms are enabled to traverse a surface of the reactant liquid and are directed across a collection surface. The invention includes maintaining the collection surface and adjacent areas under conditions in which the liberated carbon atoms in the excited state phase change to a ground state by carbon nanostructure self-assembly. Maintaining conditions for facilitating this phase change and nanostructure self-assembly includes maintaining an appropriate collection atmosphere in a collection area above the reactant liquid with the collection surface located in the collection area. These nanostructure collection conditions may also require maintaining appropriate mass flow conditions in the collection area and at the collection surface.

As used in this disclosure and the accompanying claims, an "excited state" for carbon atoms is any electron state above the ground state. In an excited state according to the present invention, the electrons of the liberated carbon atoms may be either at the second energy level, third energy level, or fourth energy level, and including the valence energy level. The "collection conditions" in the collection area comprise those conditions in which there is no chemical or physical interference with the desired nanostructure assembly or creation. Chemical interference would be any chemical reaction with the liberated carbon atoms that would prevent the carbon atoms from the desired nanostructure assembly or creation. Physical interference would be any physical condition that would prevent the carbon atoms from the desired nanostructure assembly or creation. For example, the presence of free metal atoms or other atoms other than carbon (extraneous atoms) at the points of carbon nanostructure assembly may cause the extraneous atoms to be incorporated in the carbon nanostructure or otherwise clutter or inhibit the desired nanostructure formation. Thus, a collection atmosphere according to the present invention may comprise an atmosphere in which extraneous atoms are separated or limited in some fashion from the points of nanostructure formation.

An apparatus embodying the principles of the invention includes a reactant liquid vessel, an injection arrangement, a collection chamber, and a collection surface. The reactant liquid vessel is capable of containing a suitable reactant liquid (such as a liquid reactant metal for example) at a reactant liquid level and the injection arrangement is operable to inject a stream of feed material into the reactant liquid vessel at a point below the reactant liquid level. The collection chamber is positioned to receive effluent escaping from the reactant liquid in an effluent ejection area within the reactant liquid vessel. This effluent will include the liberated carbon atoms in the excited state and other reaction products from the reaction of the feed material within the reactant liquid. The collection surface comprises a surface in the collection chamber that is at a position above the reactant liquid level and adjacent to the effluent ejection area. As will be described in detail in the following description of preferred embodiments, this collection surface may be in any one or more of a number of orientations or arrangements to provide a surface on which the excited carbon atoms in the effluent from the reactant liquid may chemically phase change and covalently bond together to form the desired carbon nanostructures.

These and other objects, advantages, and features of the invention will be apparent from the following description of the preferred embodiments, considered along with the accompanying drawings.

DESCRIPTION OF PREFERRED EMBODIMENTS

The claims at the end of this application set out novel features which the Applicant believes are characteristic of the invention. The various advantages and features of the invention together with preferred modes of use of the invention will best be understood by reference to the following description of illustrative embodiments read in conjunction with the drawings introduced above.

Figure 1:
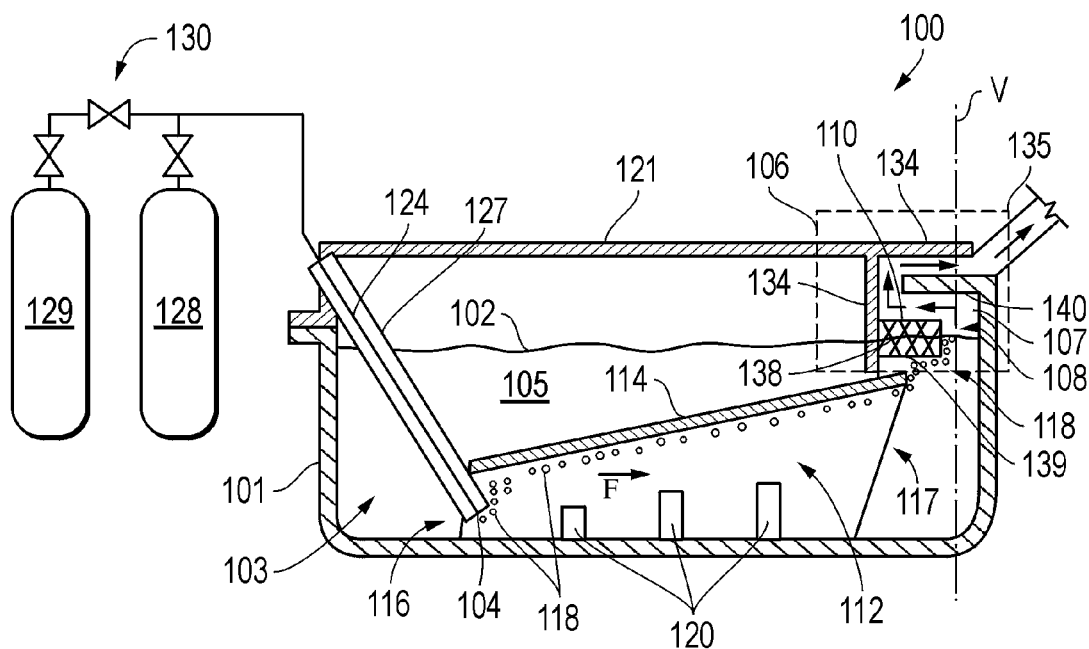
FIG. 1 is a diagrammatic representation of an apparatus embodying the principles of the invention.

Referring to the diagrammatic representation of FIG. 1, an apparatus 100 for producing carbon nanostructures according to the present invention includes a reactant liquid vessel 101 for containing a reactant liquid 105 at a reactant liquid level 102. An injection arrangement shown generally at reference numeral 103 allows a stream of feed material to be injected into reactant liquid vessel 101 at an injection point 104 below reactant liquid level 102. Apparatus 100 further includes a collection arrangement shown generally in dashed box 106. The illustrated collection arrangement includes a collection chamber 107 positioned to receive effluent escaping from the reactant liquid in an effluent ejection area shown generally at reference numeral 108. The collection arrangement also includes a collection surface 110 within collection chamber 107, the collection surface residing at a position above the reactant liquid level and adjacent to effluent ejection area 108.

Figure 2:
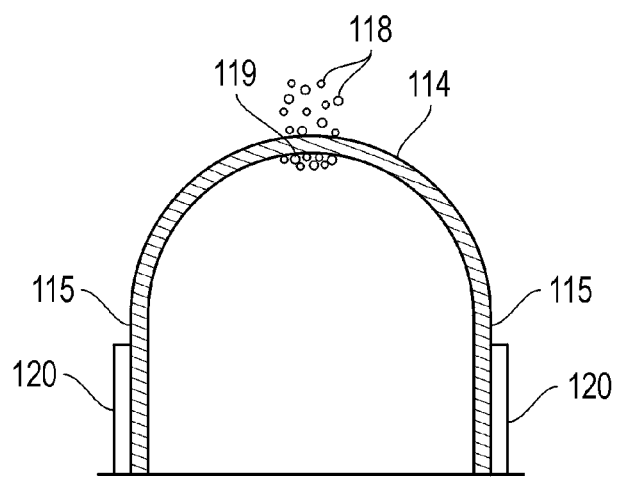
FIG. 2 is a diagrammatic end view of an outlet end of the reaction chamber shown in FIG. 1.

The apparatus shown in FIG. 1 includes a reaction chamber portion formed within vessel 101 below the reactant metal level 102. This reaction chamber is shown generally at reference numeral 112 and is defined by a tunnel structure having an upper wall 114 located below the reactant liquid level 102 in vessel 101. The tunnel structure is best shown in the end view of FIG. 2 and includes side walls 115 in addition to the upper wall 114. Referring again to FIG. 1, the tunnel structure produces an elongated tunnel below the reactant liquid level 102 in vessel 101. Feed material is injected at a feed end 116 of the tunnel structure and reaction products from the reaction of the feed material in the reactant liquid exits the tunnel structure at an outlet end 117. The figures show these reaction products in the reactant metal as bubbles 118. Preferred forms of the tunnel structure include one or more flow channels or lips 119 at the outlet end 117 that each define a location in which the relatively light reaction products collected at the top of the tunnel structure exit the tunnel. The importance of directing the reaction products to particular locations will be described further below in connection with the collection chamber 107.

This tunnel reaction chamber structure and reactant liquid vessel arrangement is similar to the arrangement shown in U.S. Pat. No. 6,227,126 to the present inventor. The entire content of this prior patent is incorporated herein by this reference. The function of the tunnel structure is to help ensure good contact between the reactant liquid and the feed material and between the reactant liquid and any intermediate reaction products that form from initial reactions of feed material. The placement of the tunnel below the reactant liquid level 102 also ensures that a pressure is maintained on the feed material and intermediate reaction products. This pressure results from the column of reactant liquid above the feed material and intermediate reaction products. The tunnel structure shown in the present drawings includes one or more vents or passages 120 along the length of the tunnel structure to allow fresh reactant metal to continually flow into the tunnel structure along its length and to help accommodate the expansion of gasses in the tunnel.

The form of the invention shown in FIG. 1 includes an enclosure 121 over reactant liquid vessel 101. It will be appreciated that apparatus 100 will also commonly require an arrangement for heating the reactant liquid to maintain it in a desired temperature range, and an arrangement for circulating the reactant liquid in vessel 101 and especially through the reaction chamber 112 defined by the tunnel structure walls 114 and 115 in the direction shown by arrow F in FIG. 1. Further details on the tunnel structure and the structure of vessel 101 and arrangements for heating and circulating reactant liquid, particularly a liquid reactant metal such as aluminum alone or together with other metals, may be found in U.S. Pat. No. 6,227,126. However, since these details are not necessary for an understanding of the present invention, such details are omitted here.

Feed material injection arrangement 103 includes an injection conduit 124 having an outlet end that extends to injection point 104 below the reactant liquid level 102. The injection point 104 is located so that the feed material exiting the conduit is captured within the tunnel structure under upper wall 114 and thus is forced to flow along the upper wall and along the entire length of the tunnel structure before it can exit the reactant liquid in effluent ejection area 108. This flow along the lower surface of upper tunnel wall 114 helps ensure complete destruction of the feed material and an intermediate reaction products that may form as the feed material is destroyed by reaction with or in the reactant liquid. Injection point 104 is also preferably at a depth below the reactant liquid level 102 to produce a desired reaction pressure due to the column of reactant liquid above the injection point. For a predominantly aluminum reactant liquid this pressure is approximately 2.4 pounds per square inch above atmospheric pressure. Due to the relatively high temperature that may be present in the reactant liquid, conduit 124 is preferably enclosed in a suitable thermal insulating sheath 127 which may comprise one or more layers of insulating material or a jacket through which a cooling fluid may be circulated. The upper end of conduit 124 is connected to a line which ultimately extends to a feed material supply 128 and preferably a purge gas supply 129 through a suitable arrangement of control valves 130.

Collection chamber 107 is located with respect to the outlet end 117 of the tunnel structure so that reaction products 118 are ultimately captured in the collection chamber. That is, the reaction products 118 flow up from flow channels 119 and traverse the surface of the reactant liquid in effluent ejection area 108 into the area defined as collection chamber 107. This area is defined by chamber walls 134. An outlet conduit 135 receives material that is not collected within chamber 107 and preferably carries that material, which may include gasses, carbon, and particulates that escape the reactant liquid bath. Although it is not shown in FIG. 1, it will be appreciated that suitable equipment may be connected to outlet conduit 135 to remove recoverable material from the effluent that reaches the outlet conduit.

In the form of the invention shown in FIG. 1, collection surface 110 comprises an upper surface of a collection structure 138 that either floats or is fixed so that a lower surface 139 of the structure resides below reactant liquid level 102 while the collection surface 110 resides above the reactant liquid level in collection chamber 107. A deflection surface 140 may also be included in collection chamber 107 positioned to deflect effluent traversing the surface of the reactant liquid in effluent ejection area 108 so that the effluent, including the carbon atoms in the excited state, flow over collection surface 110. It will be noted that in the embodiment shown in FIG. 1 both collection surface 110 and deflection surface 140 extend in a respective plane transverse to a device vertical axis V, that is, an axis that extends substantially perpendicular to a horizontal plane defined by the surface of the reactant liquid at reactant liquid level 102 beneath collection chamber 107. Also, in the embodiment shown in FIG. 1 lower surface 139 of collection structure 138 forms a blocking structure positioned above the respective flow channel 119 and below the reactant liquid level 102 in reactant liquid vessel 101. The effluent from the feed material/reactant liquid reaction must flow around this blocking structure in order to reach effluent ejection area 108 and exit the reactant liquid.

Collection surface 110 may be located from just above reactant liquid level 102 (an inch or less) to as much as three feet above the reactant liquid. One or more seed objects may be included on collection surface 110. Seed objects maybe any type of objects that encourage or facilitate the assembly of carbon nanostructures from the chemically excited carbon atoms exiting the reactant liquid bath. Seed objects may include pure catalyst metals such as titanium and platinum, for example, or metal oxides such as manganese oxide, magnesium oxide, copper oxide, chromium oxide, and titanium oxide, for example. The catalyst may or may not be sacrificial. Seed objects may also include graphite surfaces, carbon surfaces, and seed carbon nanostructures. The seed objects may be spaced apart across collection surface 110 or may make up the entire collection surface. For example, the entire collection structure 138 may be formed from graphite or carbon or some other material that serves as a seed material.

Figure 3:
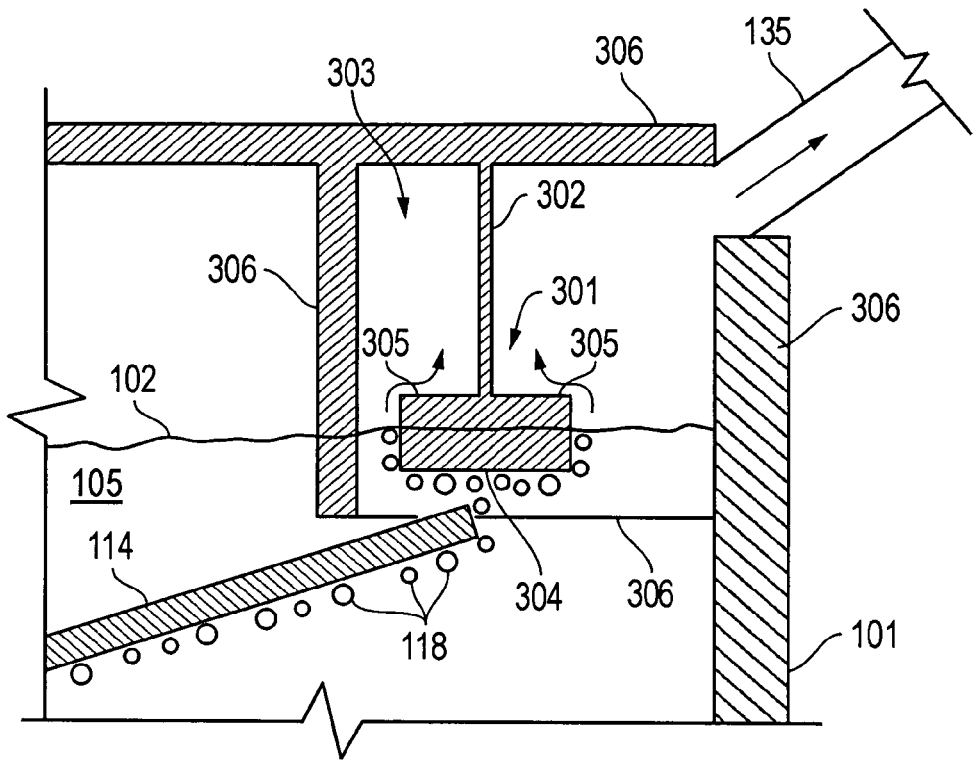
FIG. 3 is a diagrammatic representation of an alternate collection chamber according to the present invention.

Referring to FIG. 3, an alternate collection surface arrangement includes a collection structure 301 mounted on a rod 302 or other suitable support in collection chamber 303 defined by chamber walls 306. Lower surface 304 of structure 301 provides a blocking surface similar to surface 139 shown in FIG. 1, surface 305 provides the collection surface in the embodiment shown in FIG. 3. This alternate embodiment is advantageous because the entire collection structure 301 may be readily withdrawn from collection chamber 303 through a suitable access opening (not shown) in the chamber in order to gain access to the collection surface 305 and remove carbon nanostructures that have collected on the collection surface. It is noted that the vessel 101, outlet conduit 135, tunnel upper wall 114, reactant liquid 105 and reactant liquid level 102 are identical to those shown in FIG. 1.

Figure 4:
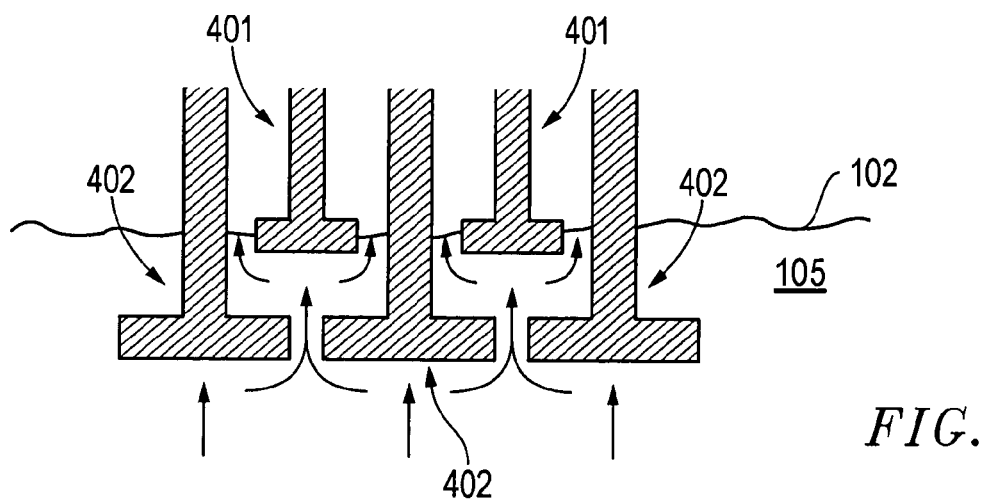
FIG. 4 is a diagrammatic representation of another alternate collection surface arrangement within the scope of the present invention.

The alternative embodiment shown in FIG. 4, includes collection structures 401 similar to structure 301 shown in FIG. 3. However, the embodiment shown in FIG. 4 also includes additional blocking structures 402 supported below the reactant liquid level 102. These blocking structures 402 direct reaction products in the reactant liquid 105 toward a central portion of each collection structure 401 so that the reaction products must flow around the collection structures to exit the reactant liquid. It will be noted that the view in FIG. 4 is at about 90 degrees to the view in FIGS. 1 and 3. It will be further noted that multiple spaced apart flow channels at the outlet end 117 of a tunnel structure such as that shown in FIG. 1 would be required to allow the reaction products to flow up properly beneath each of the blocking structures 402 shown in FIG. 4.

Figure 5:
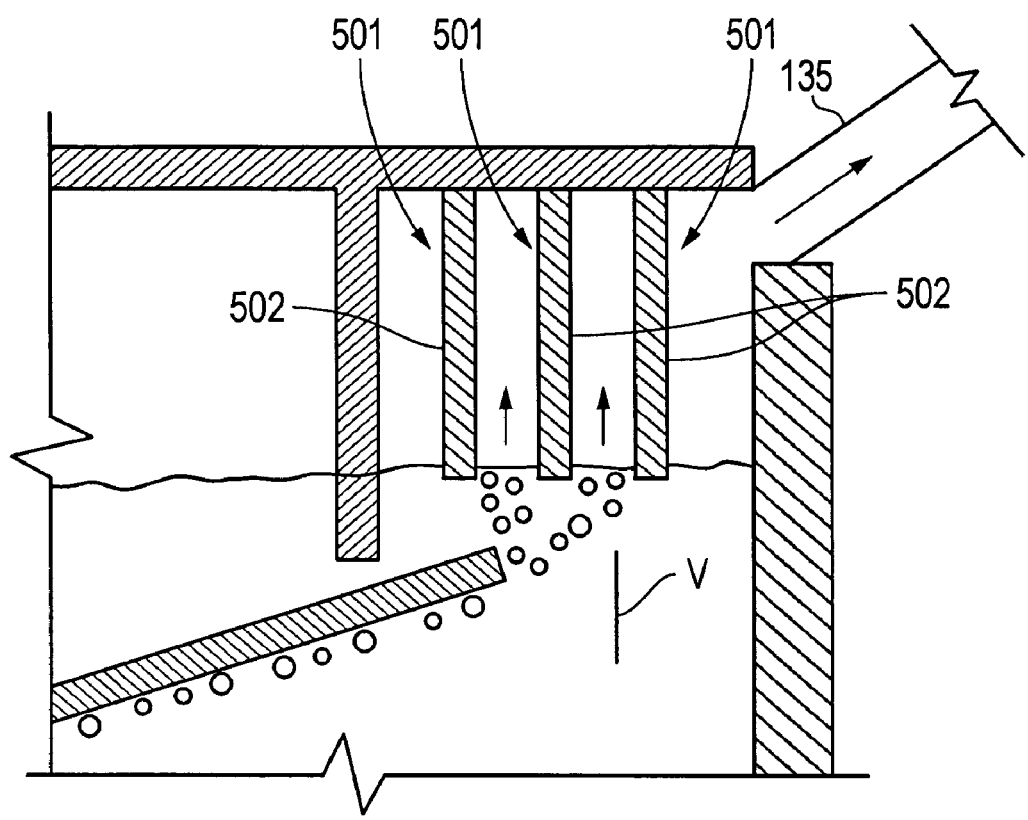
FIG. 5 is a diagrammatic representation of another alternate collection chamber according to the present invention.

The alternate collection arrangement shown in FIG. 5 includes a series of collection members 501 having vertically extending collection surfaces 502. The vertical orientation of surfaces 502 is in contrast to the collection surface 110 shown in FIG. 1, which extends transverse to the device vertical axis V. That is, the collection surfaces 502 extend parallel to device vertical axis V rather than transverse. Collection members 501 may comprise cylinders or plates that are spaced apart sufficiently to allow effluent other than the materials to be incorporated in nanostructures to reach outlet conduit 135.

A method according to the present invention may now be described with reference particularly to the embodiment shown in FIG. 1. Such a method includes liberating carbon atoms from hydrocarbon molecules by reaction within or with a reactant liquid and maintaining the liberated carbon atoms in an excited state. This step is performed in apparatus 100 in FIG. 1 by contacting a hydrocarbon feed material from supply 128 with the reactant liquid in vessel 101. Sufficient contact time to product the liberated carbon atoms in the excited state in apparatus 100 by ensuring that the feed material and any intermediate reaction products must flow the entire length of the tunnel structure defined by upper tunnel wall 114. Also, the reactant liquid is maintained at a suitable reaction temperature to effect the desired liberation of carbon atoms. For example, where the reactant liquid is made up predominantly of aluminum the liquid is maintained between approximately 650 degrees Celsius and approximately 950 degrees Celsius. Injection point 104 and upper tunnel wall 114 are located deep enough in the reactant liquid to produce a desired reaction pressure, preferably at least 2.4 psig at least at some point in the apparatus where the reactant liquid comprises aluminum. These preferred temperatures and pressure conditions together with the nature of the reactant liquid ensure the liberation of the desired chemically excited carbon atoms.

The method also includes enabling the liberated carbon atoms in the excited state to traverse the surface of the reactant liquid in the effluent ejection area 108, and directing the liberated carbon atoms in the excited state across collection surface 110 which may include one or more seed materials or objects. Collection conditions are maintained in chamber 107 and at collection surface 110 at which the liberated carbon atoms in the excited state phase change to a ground state by carbon nanostructure self-assembly.

Maintaining collection conditions in chamber 107 and at surface 110 may include controlling the temperature and effluent flow conditions as well as the appropriate atmosphere in chamber 107. In particular, an appropriate collection atmosphere comprises an atmosphere that does not chemically or physically interfere with the desired carbon nanostructure formation. Purging collection chamber 107 of materials that could chemically react with the liberated carbon before it can form the desired nanocarbon structures may be particularly important in creating and maintaining the desired collection atmosphere. Thus, a preferred process includes first purging the chamber 107 by directing a suitable purge gas such as argon or some other noble gas or an inert gas from purge supply 129 to chamber 107. A separate purge arrangement may alternatively or additionally be included in the system with a purge inlet directly in chamber 107 to prevent having to run the purge gas through the reactant liquid.

The flow regime of effluent exiting the reactant liquid and flowing through collection chamber 107 may be important for allowing the chemically excited carbon atoms to bond together to produce the desired carbon nanostructures without extraneous atoms becoming incorporated in the structures. It is believed that a turbulent flow regime over collection surface 110 best facilitates the production of carbon nanostructures without incorporating heavier atoms (such as metals) that may escape from the reactant liquid bath. It may also be possible to adjust the flow rate and composition of effluent flowing over collection surface 110 to encourage the incorporation of various atoms other than carbon in the carbon nanostructures produced at the collection surface. The invention encompasses numerous techniques for controlling the composition and flow rate of effluent through collection chamber 107 and over collection surface 110. The relative amount of hydrocarbon in the material injected at point 104 and the type or types of hydrocarbon materials injected may influence both flow rate and content of flow. An inert or noble gas may be injected together with the feed material from purge gas supply 129 or from some other supply to affect the flow rate of effluent through chamber 107 and the content of the effluent.

Some forms of the invention may purposefully inject one or more materials into the collection chamber 107 through a separate collection chamber input, that is, separate from effluent ejection area 108, in order to affect the flow characteristics in the flow chamber and in order to provide desired materials to be incorporated in the carbon nanostructures. Such a separate collection chamber input may include a suitable tube (not shown) which traverses a collection chamber wall and which includes an injection end at a point to direct injected materials against collection surface 110 as effluent flows up from the reactant liquid 105 and passes over the collection surface. Particles of seed material may also be injected into collection chamber 107 with such an injection conduit. These particles of seed material may be injected prior to enabling the chemically excited carbon atoms to flow across collection surface 110 or while carbon atoms are flowing across the collection surface.

The invention also encompasses numerous variations to produce the desired flow regime and flow characteristics through collection chamber 107. Two methods are employed in apparatus 100 shown in FIG. 1. One method employs a deflection surface 140 to deflect effluent escaping from the reactant liquid at effluent ejection area 108. This deflection is preferably produced no more than three feet above the surface of the reactant liquid. Other types of deflection surfaces or features may also be employed according to the present invention. The other flow regime and characteristic affecting technique used the apparatus shown in FIG. 1 comprises providing collection surface 110 in a transverse plane with respect to device vertical axis V along which the effluent initially flows as it escapes the reactant liquid. Providing this transverse collection surface 110 produces a low pressure area on the collection surface in an area near the rightmost edge in FIG. 1. The low pressure area created as effluent flows over the rightmost upper edge of collection structure 138 in FIG. 1 is believed to encourage the collection of chemically excited carbon atoms at that location of collection surface 110 and the production of carbon nanostructures at that location.

It will be appreciated that numerous different collection surface profiles or contours may be employed to encourage the desired collection of carbon atoms and self-assembly of nanostructures. For example, collection surface 110 may include one or more projections and/or indentations to produce the desired flow characteristics across the collection surface.

Any number of reactant liquids may be used to react the feed materials or feed material constituents according to the present invention. A preferred reactant liquid comprises liquid aluminum either alone or with other metals as disclosed in U.S. Pat. No. 5,000,101, which is also incorporated herein in its entirety. Temperatures may preferably range from approximately 650 degrees Celsius to approximately 950 degrees Celsius for reactant metals incorporating a substantial fraction of aluminum. Other reactant liquids may be used within different temperature ranges sufficient to liberate carbon atoms in the chemically excited state for assembly into nanostructures at collection surface 110. The invention encompasses any liquid that either reacts with the feed material or otherwise causes carbon atoms in the desired excited state to be liberated from the feed material. The chemically excited carbon atoms may be liberated by chemical reduction (as in the case of a reactant liquid made up predominantly of aluminum), by chemical oxidation, by providing chemically neutral electron reduction potentials, or by applying sufficient kinetic energy (through heat) to break the carbon bonds to other atoms in the feed molecules, or by any of these mechanisms. The reactant liquid may be a metal, acid, base, salt, or any combination of these. The temperature of the particular liquid will depend upon the particular reaction required to liberate the excited carbon atoms and the nature of the reactant liquid itself. For example, chemically neutral liquids that liberate carbon atoms by heat alone may be held at very high temperatures to produce the desired carbon liberation, on the order of approximately 1500 degrees Celsius or more.

Collection surface 110 is also preferably maintained in a similar temperature range as the reactant liquid, and most preferably at a temperature just below the reactant liquid temperature, for example, approximately fifty (50) degrees Celsius or less below the liquid reactant temperature. It is believed that these reactant liquids, and temperatures, together with the reaction pressure and contact time with the reactant liquid not only completely liberate the carbon atoms from the hydrocarbon feed material but also places the carbon atoms in an excited state. The reactant liquid is also believed to surround the liberated carbon atoms while they are still in the reactant liquid to maintain the carbon atoms in the chemically excited state and prevent them from phase changing to a ground state before they have a chance to self-assemble into the desired nanostructures at the collection surface. The conditions are maintained at the collection surface according to the present invention so that these excited carbon atoms phase change to a ground state as they bond covalently with other carbon atoms at the collection surface to form the desired carbon nanostructures.

It will be appreciated that some carbon that escapes the reactant liquid may also be diatomic carbon and double or triple bonded carbon. As used in this disclosure and the accompanying claims, "liberated carbon atoms" includes single atom carbon, diatomic carbon, and other two-carbon combinations such as two-carbon double bonded structures and two-carbon triple bonded structures. All of the liberated carbon atoms escaping the reactant liquid will be chemically excited. Some of the two-carbon combinations that may escape the reactant liquid may be incorporated, together with single, chemically excited carbon atoms, into molecularly combined carbon nanostructures within the scope of the present invention.

The present invention may use any number of hydrocarbon compounds as the feed material or as part of the feed material. Preferred forms of the invention utilize hydrocarbon compounds including single-bonded carbon either predominantly or exclusively. However, compounds including double and triple bonded carbon may be used according to the invention provided sufficient contact time with the reactant liquid to liberate carbon atoms and place them in a chemically excited state for assembly into carbon nanostructures. Some forms of the invention may adjust the content of the various hydrocarbon materials in a feed material mixture to provide a desired concentration of liberated single carbon atoms and liberated carbon molecules for incorporation into the desired carbon nanostructures. For example, the feed materials may be manipulated so that the effluent escaping the reactant liquid includes carbon in desired relative concentrations of single carbon atoms and double bonded carbon molecules.

Figure 6:
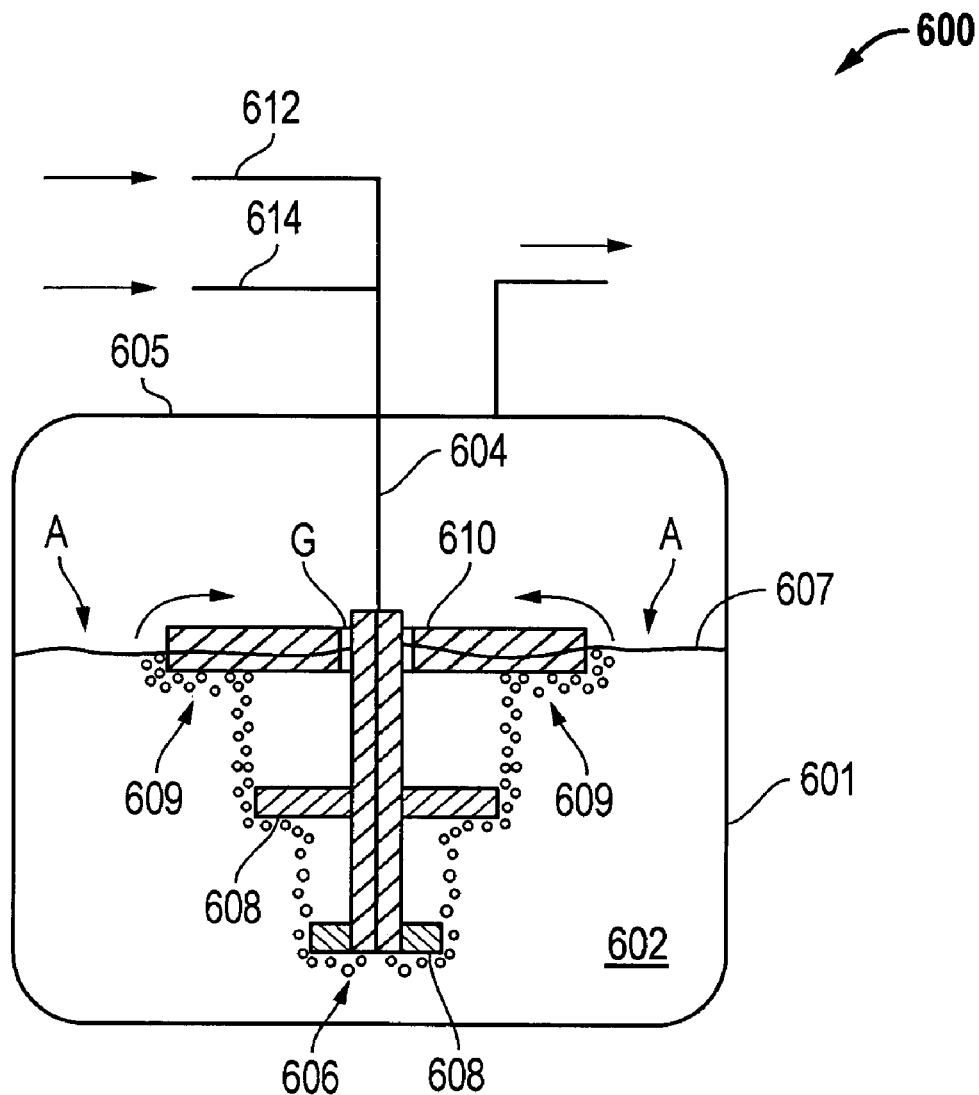
FIG. 6 is a diagrammatic representation of a test apparatus that has been used to produce carbon nanostructures according to the present invention.

Tests which were conducted according to the present invention may be described with reference to the test apparatus 600 shown diagrammatically in FIG. 6. This test apparatus 600 included a vessel 601 containing liquid reactant metal 602 made up of predominantly aluminum together with a number of other metals at about 930 degrees Celsius. The liquid reactant metal 602 was continuously circulated to and from a heating chamber not shown in FIG. 6 with a stirring device also not shown in the figure. An injection/collection structure included in test apparatus 600 was made up of an injection conduit 604 that extended down from a top wall 605 to an injection point 606 below the level 607 of reactant metal 602. Subsurface deflecting elements 608 helped prevent reaction products 609 from escaping the bath too quickly. A collection structure 610 included a rectangular plate generally centered in vessel 601. Effluent escaping from the reactant metal 602 traversed the surface of the metal at level 607 in areas A and in small gaps G between injection conduit 604 and collection structure/plate 610. During the collection part of the test, plate 610 was mostly submerged in liquid metal 602 leaving at most about one-half inch of the plate thickness above level 607.

In the tests, once the injection conduit/collection structure was in place in vessel 601, argon gas was injected through input line 612 and ultimately through conduit 604 and the reactant metal to displace air and any other gasses trapped in the area between level 607 and top 605 which formed the collection area of the apparatus. Once the collection area was purged with argon gas, methane was injected through input 614 at a rate of approximately four liters per minute for between thirty and forty-eight hours. Thereafter, acetylene gas and motor oil were also pumped through conduit 604. The injection conduit/collection structure was then removed from vessel 601 and allowed to cool in open air. Black soot-like material was observed over substantially the entire upper surface of collection plate 610. This material was scraped off of plate 610 in several areas and observed through a scanning electron microscope down to a resolution of approximately one micron and a transmission electron microscope at up to 200,000 times magnification. These observations showed double-walled carbon nanotubes and carbon nanoropes in the sample material.

The above described preferred embodiments are intended to illustrate the principles of the invention, but not to limit the scope of the invention. Various other embodiments and modifications to these preferred embodiments may be made by those skilled in the art without departing from the scope of the present invention.

The invention claimed is:

1. A method for producing carbon nanostructures, the method including:
   (a) producing a collection atmosphere within a collection chamber which defines a collection area above a reactant liquid;
   (b) injecting a feed material into the reactant liquid, the feed material comprising a quantity of a first type of hydrocarbon compound;
   (c) maintaining the hydrocarbon molecules of the first type of hydrocarbon compound and any reaction products in contact with the reactant liquid for a period of time sufficient to liberate carbon atoms from the hydrocarbon molecules of the first type of hydrocarbon compound or reaction products and place the liberated carbon atoms in an excited state;
   (d) enabling the liberated carbon atoms in the excited state to traverse a surface of the reactant liquid and flow through the collection area so that the liberated carbon atoms pass over a collection surface within the collection chamber under conditions in which the liberated carbon atoms are enabled to phase change to the ground state;
   (e) collecting carbon nanostructures on the collection surface as the liberated carbon atoms phase change to the ground state at the collection surface;
   (f) removing the collection surface from the collection chamber; and
   (g) removing carbon nanostructures from the collection surface after the collection surface is removed from the collection chamber.

2. The method of claim 1 wherein the collection surface is maintained at a temperature between approximately 600 degrees Celsius to approximately 950 degrees Celsius.

3. The method of claim 1 wherein the reactant liquid includes liquid aluminum at a temperature at or above 650 degrees Celsius.

4. The method of claim 1 wherein the step of producing the collection atmosphere includes purging the collection area of oxygen.

5. The method of claim 1 further including the step of maintaining a turbulent flow regime in gasses flowing across the collection surface.

6. The method of claim 1 wherein the collection atmosphere includes one or more purge gases selected from a group consisting of nitrogen, helium, argon, carbon monoxide, and heater burner flue gasses.

7. The method of claim 1 wherein the step of maintaining the hydrocarbon molecules and any reaction products in contact with the reactant liquid includes placing the hydrocarbon molecules and reaction products in contact with the reactant liquid under a pressure of at least approximately 2.4 psig.

8. The method of claim 1 wherein the step of maintaining the hydrocarbon molecules and any reaction products in contact with the reactant liquid includes trapping the hydrocarbon molecules and reaction products in a reaction chamber having an upper surface below the surface of the reactant liquid.

9. The method of claim 1 wherein the step of injecting the hydrocarbon molecules into the reactant liquid comprises injecting the hydrocarbon into a bath of reactant liquid at a depth sufficient to produce at least approximately 2.4 psig of pressure on the injected hydrocarbon molecules by the column of reactant liquid above the hydrocarbon molecules.

10. The method of claim 1 further including the step of positioning a seed material on the collection surface.

11. The method of claim 10 wherein the seed material includes a carbon nanostructure.

12. A method for producing carbon nanostructures, the method including:
   (a) liberating carbon atoms from hydrocarbon molecules by reduction reaction with a reactant liquid and maintaining the liberated carbon atoms in an excited state; and
   (b) enabling the liberated carbon atoms in the excited state to traverse a surface of the reactant liquid into a collection chamber which defines a volume above the reactant liquid;
   (c) directing the liberated carbon atoms in the excited state across a collection surface within the collection chamber under collection conditions at which the liberated carbon atoms in the excited state phase change to a ground state by carbon nanostructure self-assembly;
   (d) collecting carbon nanostructures on the collection surface as the liberated carbon atoms phase change to the ground state by carbon nanostructure self-assembly;
   (e) removing the collection surface from the collection chamber; and
   (f) removing carbon nanostructures from the collection surface after the collection surface is removed from the collection chamber.

13. The method of claim 12 further including the step of directing the liberated carbon atoms in the excited state across at least one seed material on the collection surface.

14. The method of claim 12 further including the step manipulating the flow of gasses traversing the surface of the reactant liquid to produce a low pressure area adjacent to the collection surface.

15. The method of claim 12 further including the step of maintaining the collection surface at a temperature of between approximately 600 degrees Celsius to approximately 950 degrees Celsius.

16. The method of claim 12 wherein the reactant liquid includes predominantly aluminum at a temperature of approximately 950 degrees Celsius.

17. The method of claim 16 further including the step of maintaining the hydrocarbon molecules and reaction products under a pressure of at least approximately 2.4 psig prior to traversing the surface of the reactant liquid.

18. The method of claim 12 wherein the step of directing the liberated carbon atoms in the excited state across the collection surface includes deflecting the liberated carbon atoms along a flow path transverse to a line extending perpendicular to the reactant liquid surface and wherein the deflection is accomplished no further than approximately three feet from the level of the reactant liquid surface.

19. The method of claim 12 further including the step of securing one or more types of seed materials on the collection surface prior to directing the liberated carbon atoms in the excited state across the collection surface.

20. The method of claim 12 wherein the step of liberating carbon atoms from hydrocarbon molecules includes trapping the hydrocarbon molecules and other reaction products in a reaction chamber having an upper surface below the surface of the reactant liquid.

21. The method of claim 20 further including the step of directing the liberated carbon atoms in the excited state and other reaction products around a blocking structure extending into the reactant liquid.

22. The method of claim 21 wherein the collection surface comprises an upper surface of the blocking structure and the upper surface of the blocking structure resides above a level of the reactant liquid.

23. An apparatus including:
   (a) a reactant liquid vessel for containing a reactant liquid at a reactant liquid level;
   (b) a collection chamber defined by collection chamber walls and positioned to receive effluent escaping from the reactant liquid in the reactant liquid vessel;
   (c) an injection arrangement for injecting a stream of feed material into the reactant liquid vessel at an injection point below the reactant liquid level and laterally spaced apart from the collection chamber;
   (d) an elongated reaction chamber defining a flow path for feed material and reaction products from the injection point to a location below the collection chamber; and
   (e) a number of collection structures mounted in the collection chamber, each collection structure providing a respective collection surface within the collection chamber, the collection surfaces residing at a position above the reactant liquid level in the collection chamber and being separate from the collection chamber walls.

24. The apparatus of claim 23 wherein at least one of the collection surfaces includes a portion extending in a plane transverse to a device vertical axis.

25. The apparatus of claim 24 wherein the portion of a respective collection surface extending in the plane transverse to the device vertical axis includes a portion located no more than approximately three feet above the reactant liquid level of the reactant liquid vessel.

26. The apparatus of claim 23 further including at least one seed object on a respective one of the collection surfaces.

27. The apparatus of claim 23 further including a deflecting surface forming a portion of the collection chamber, the deflection surface extending transverse to the device vertical axis in position to deflect effluent escaping from the reactant liquid so that the effluent flows across one or more of the collection surfaces.

28. The apparatus of claim 23 further including a flow channel formed at an outlet end of the reaction chamber, and a blocking structure positioned directly above the flow channel and below the reactant liquid level in the reactant liquid vessel.

29. The apparatus of claim 23 wherein at least one collection surface comprises an upper surface of a respective one of the collection structures and the respective collection structure has a lower surface located below the reactant liquid level, the lower surface extending transverse to a device vertical axis.

30. The apparatus of claim 23 wherein at least one collection surface includes graphite.

* * * * *